March 7, 1939.   E. BRUNATTO   2,149,504
MEANS AND METHOD OF SATURATING TRANSMISSION AIR
Filed May 7, 1936
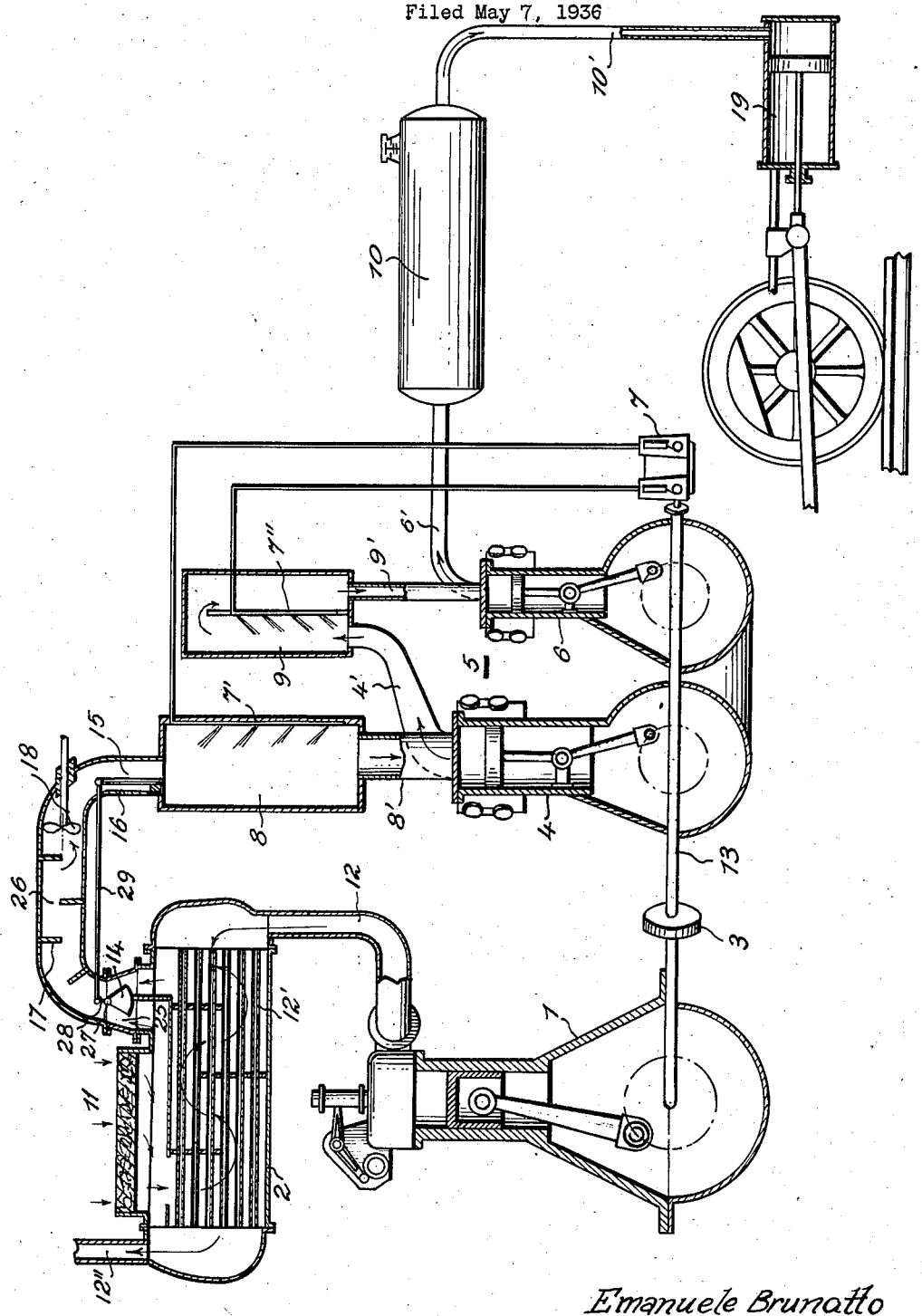
Emanuele Brunatto
Inventor
By: Glascock Downing & Seebold
Attys.

Patented Mar. 7, 1939

2,149,504

UNITED STATES PATENT OFFICE 2,149,504

MEANS AND METHOD OF SATURATING TRANSMISSION AIR

Emanuele Brunatto, Paris, France

Application May 7, 1936, Serial No. 78,485
In France May 8, 1935

2 Claims. (Cl. 60—14)

It is already known in transmission systems to employ a Diesel motor, for driving a compressor which forces air into receivers wherein the air compressed by the compressor acts as a driving fluid. Such a transmission system is preferred for locomotives.

In the case however of high power it is advantageous, nay indispensable, in order to obtain that the air expansion should occur without inconveniences and without a too strong drop of temperature, to mix with the air some water steam, which by condensing returns the heat of vaporization thus diminishing the drop of the temperature of the air expanded.

An object of the present invention is to provide a process for obtaining a driving fluid in a predetermined thermodynamic state, having a determined pressure, temperature and percentage of steam.

According to the present invention it is especially advisable to choose a cycle comprising two compressions bringing the fluid to a determined temperature and pressure each of said compressions being preceded by an injection of a determined quantity of water, the temperature of the air on the points where these injections occur and the quantities injected being such that this water is rapidly vaporized and causes the temperature of the mixtures to drop.

According to a modification of the process the stabilization of the temperature of the air is obtained by a thermostat varying the quantity of the exhaust gases running through the preheating apparatus of the air, a part of these gases being thus eventually rejected into the atmosphere without passing through this exchanging device.

The thermostat is then adjusted in such a manner as to open the slide or butterfly valve freeing the exhaust gases, when the temperature of the preheated air tends to increase.

Of course both the methods mentioned of stabilization of the temperature may be utilized at the same time in combination.

The following description with reference to the accompanying drawing, though the description and drawing are given by way of an example, will clearly show how the invention may be realized.

In the figure, 1 shows the Diesel motor, 2 the air heating apparatus, 5 the compressor group comprising a low pressure cylinder 4 and a high pressure cylinder 6 the water injection pumps are illustrated at 7 which send water at 7' and 7" into saturators 8 and 9 with piping 4' and 9';

10 illustrates the receiver where the final mixture is admitted through piping 6' and whence the mixture is sent through piping 10' to the driving cylinders 19. 3 is the coupling for the compressor motor shaft 13.

The temperatures and percentages of steam of the mixture correspond to an actual heating cycle.

Atmospheric air is sucked into heater 2 through filters 11, this heating device being heated by the exhaust gases of the motor 1, conveyed by piping 12 which extend across the heater 2.

The temperature of the exhaust gases is nearly 400° C. and they heat the air to a minimum temperature of 120° C.

Should the temperature of this air escaping at 12" from heater 2 be higher than 120° C. then a certain percentage of fresh air is admitted through piping 25. This fresh air is filtered by means of the filter 11.

This quantity of air is regulated by a valve 14 in order to obtain the temperature of 120° C. for the mixture, this object being attained by means of a thermostatic device 15 of any convenient type whatever subjected to the temperature of this mixture in a point 16 where the mixture is completely achieved.

The valve 14 is mounted to swing on a pivot 27 so as to restrict or open the passage 25. An arm 28 rigidly fixed to the valve 14 is pivotably fitted at its other end to a rod 29 which is moved by the thermostat 15. The thermostat may be of any well known type such as a bi-metallic element which is adapted to have the upper end thereof move to the left upon an increase in temperature to thus swing the valve 14 in a counter-clockwise direction and admit more fresh air into the passage 26.

Beyond the valve 14 and in the pipe 26 there are arranged some baffle plates 17 and a rotating mixing device 18 all this structure and apparatus being designed to thoroughly mix the mixture. The point 16 where the temperature is taken is beyond these mixing devices.

The air at 120° C. is conveyed into the presaturator 8, where the pumps inject finely atomized water (in the ratio of 3% of the quantity of air) which is transformed into steam and causes the temperature to drop to 45° C.

This air at 45° C. thus charged with steam is sucked into the low pressure cylinders 4 where it is compressed at 4.7 absolute atmospheres and brought to a temperature of 210° C.

The mixture of air and steam, after this first compression is sent to the saturator 9, in which the percentage of steam of the water injected by pumps 7 through 7″ increases by 5%.

This injection brings the temperature back to nearly 100° C.

The mixture thus obtained at 100° C. and 4.7 absolute atmospheres is admitted into the high pressure cylinder 6 in which it is compressed at 16 absolute atmospheres and its temperature increases to 230° C.

This mixture of air, 8% steam, plus natural moisture, arrives through 6′ into the receiver 10 from which it is sent through piping 10′ to the driving cylinders 19 of the locomotive.

The principle of the pre-determination of the final state of the mixture owing to the fixation of the initial conditions and of the compressions and injections during the cycle remains always the same.

Having now particularly described and ascertained the nature of my said invention and in what manner the same is to be performed, I declare that what I claim is:

1. In a pneumatic motor transmission having a Diesel motor and a driving cylinder, the combination with a series of compressors actuated by said motor, an air heater, means for transferring exhaust gases at high temperature from the motor into said heater, a filter piping admitting atmospheric air to the heater, a conduit adapted to convey the heated air from the heater to the first compressor in said series, a valve and a thermostat in the conduit for regulating the temperature of air passing therethrough, a preliminary saturator in said conduit with water spray, another conduit between the first and the next compressor for conveying saturated air to said next compressor in said series, a saturator with water spray in said other conduit, a pipeline connecting said other compressor with said driving cylinder, a receiver for the air and steam mixture inserted in said pipe-line and an injection pump supplying said sprays.

2. Process for saturating compressed air in a pneumatic motor transmission which consists in utilizing high temperature exhaust gas of about 400° C. from the motor for heating filtered atmospheric air, preliminarily saturating the heated air with water spray obtaining a temperature of about 45° C. and 3% atomized water, regulating the temperature of the heated air previous to its saturation, then compressing the preliminarily saturated air in a low pressure compressor to 4.7 atmospheres and a temperature of about 210° C., thereupon again saturating the compressed air with water spray and lowering its temperature to about 100° C. at 4.7 atmospheres and about 8% atomized water content, then again compressing the re-saturated air in another low pressure compressor, thus obtaining a saturated product with about 8% steam of 230° C. temperature at about 16 atmospheres pressure and finally conveying said product for the operation of a driving cylinder.

EMANUELE BRUNATTO.